Jan. 2, 1945.   C. E. STRINGER   2,366,294
TONGUE FOR TRAILER VEHICLES
Filed Oct. 25, 1943
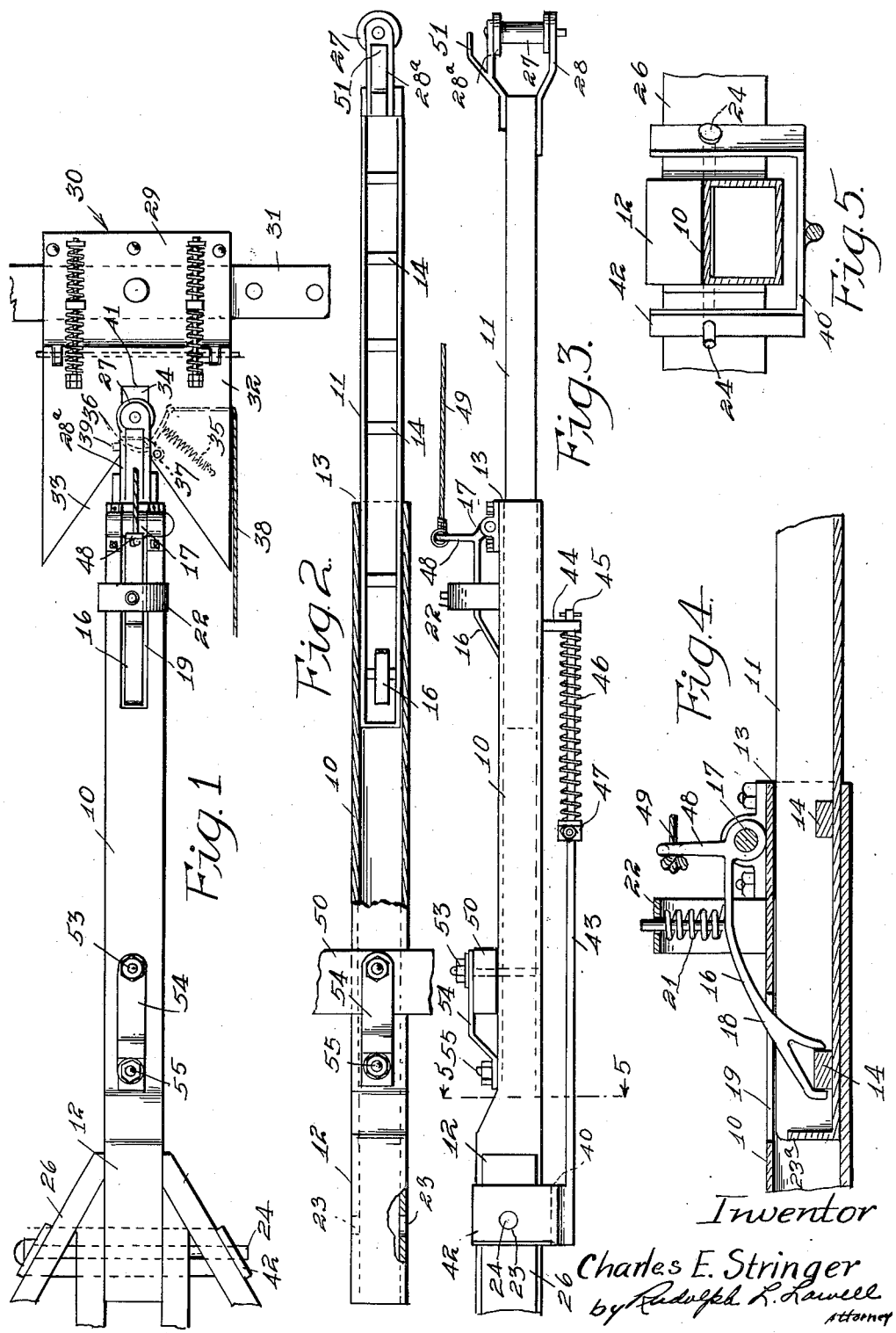

Patented Jan. 2, 1945

2,366,294

UNITED STATES PATENT OFFICE 2,366,294

TONGUE FOR TRAILER VEHICLES

Charles Edward Stringer, Farnhamville, Iowa

Application October 25, 1943, Serial No. 507,619

1 Claim. (Cl. 280—33.44)

This invention relates generally to a tongue for a trailer vehicle and in particular to an extensible tongue for a wagon adapted to be connected to a power operated tractor or drawn by horses.

A trailer vehicle such as a wagon which is attachable to a tractor or the like usually has a stub tongue to provide for the wagon being adjacent the tractor and to in turn reduce the over-all length of the tractor-trailer combination. When it is desired to have the wagon drawn by a team of horses, therefore, it is necessary to replace the stub tongue with a wagon tongue of normal length. As a result two tongues are usually required to provide for the wagon being drawn by horses and a tractor.

Where the wagon is tractor-drawn through a stub shaft considerable difficulties are encountered in making sharp turns because of the interference between parts of the wagon with a part of the tractor or vehicle to which it is connected. This is particularly true where the wagon is attached to the back of a corn picker, as is customary in corn picking operations, because of the interference of the wagon with the elevator structure at the rear end of the corn picker.

Another disadvantage with the usual wagon tongue is found in the fact that on disconnection from a tractor or the like its free end falls to the ground. Connecting the tongue with the tractor, therefore, generally requires appreciable manipulation of the tractor to position it relative to the tongue so that the tongue on being lifted is adjacent the point of connection on the tractor. Also one man, additional to the tractor operator, is needed to lift and manipulate the tongue to a tractor connecting position. As a result the tongue connecting operation is generally awkward and inconvenient.

It is an object of this invention, therefore, to provide an improved tongue for a trailer vehicle.

Another object of this invention is to provide a wagon tongue which is adjustable to various lengths.

Yet another object of this invention is to provide an extensible tongue for a tractor drawn wagon having means manually actuated by the tractor operator, while he is on the tractor, for extending the tongue to a desired length while the wagon is being pulled.

A feature of this invention is found in the provision of a wagon tongue having means at its free end adapted for connection with a tractor unit and means at its opposite end providing for its support away from the ground to facilitate its connection with the tractor unit.

Further objects, features and advantages of this invention will become apparent from the following description when taken in connection with the accompanying drawing in which:

Fig. 1 is a plan view of the wagon tongue of this invention showing it in a fully contracted position and connected with a tractor unit;

Fig. 2 is a plan view of the wagon tongue showing it in a partly extended position and with parts in section to more clearly show its construction;

Fig. 3 is a side elevational view of the tongue when it is in the extended position shown in Fig. 2;

Fig. 4 is an enlarged fragmentary sectional view showing the means for locking the extendible member of the tongue in an adjusted position; and Fig. 5 is an enlarged sectional view as seen on the line 5—5 in Fig. 3.

With reference to the drawing the tongue of this invention is illustrated in Figs. 2 and 3 as comprised of a pair of telescoping members 10 and 11. The main member 10 (Figs. 2 and 5) is of a tubular construction of a substantially rectangular cross section and has an enlarged end section 12. The extendible member 11 is of channel construction of a size to be received in the open end 13 of the main member 10 and slidably supported within the main member 10 for longitudinal movement relative thereto.

To provide for the extension of the member 11 to adjusted positions relative to the main or tubular member 10 lug or block portions 14 are longitudinally spaced within and at the bottom of the slidable channel member 11. The member 11 has its open side toward the top of the wagon tongue as shown in Figs. 2 and 3. Cooperating with the lugs 14 to hold the member 11 in an adjusted position is a pivoted latch member 16 of angular shape having one end pivotally supported in a bearing member 17 carried on the top of the main member 10 adjacent its end 13, and an opposite end 18 extended through an opening 19 in the top of the member 10 for engaging the lugs 14 (Fig. 4). The end of the latch 18 is of a bifurcated construction with the bifurcations being spaced a distance apart corresponding substantially to the width of a lug 14. Thus when the latch 16 is in an engaged position with a lug 14 a bifurcation is positioned to each side of a lug, as clearly shown in Fig. 4, to in turn hold the extendible member 11 against longitudinal movement in either direction relative to the main member 10. The latch 16 is yieldably urged into an engaging position with a lug 14 by a spring 21 arranged in compression between the latch 16 and a bracket 22 carried on the main member 10. As best appears in Fig. 4 the inner end 23a of the member 11 is bent upwardly to a position for engaging the latch 16 and constitutes a limit for defining the maximum extension of the member 11 from the member 10.

In order to attach the tongue to a wagon or like vehicle (not shown) the enlarged end portion 12 of the member 10 has aligned holes 23 in opposite sides thereof to receive a usual king pin 24 extended through hound members 26 for the wagon (Figs. 1, 2 and 3). The attachment of the tongue and hounds is accomplished by removing the king pin 24 and inserting the tongue between the hound members 26 until the openings 23 are in alignment with the king pin openings in the hounds 26. The king pin 24 is then inserted through the aligned openings and pivotally supports the tongue for pivotal movement in an up and down direction between the hound members 26.

For connecting the tongue with a tractor (not shown) the free end of the extendible member 11 carries a roller 27 which is rotatably supported between arms 28 and 28a welded or otherwise secured to the bottom and top of the member 11 as viewed in Fig. 3. Coacting with the roller 27 and carried on the tractor is a coupler device indicated generally at 30 comprised of a base portion 29 which is secured to a draw bar 31 on the tractor. Pivotally connected to the base member 29, for movement in an up and down direction, is a coupler plate 32 having a guiding recess 33 for the roller 27 formed in its free end. The plate 32, at the bottom of the guide recess 33, is cut away to form a pocket 34 for receiving the roller 27. The roller is held within the pocket 34 by a spring pressed keeper 36 which is pivoted at 37 and manually operated out of a roller holding position through a rope or the like 38.

As viewed in Fig. 1 the keeper 36 is movable in a clockwise direction to a position under the plate 32 and out of the pocket 34 to permit the roller 27 entering the pocket. The keeper 36 is moved in a counterclockwise direction by a spring 35 to its roller locking or holding position defined by engagement of the keeper with a stop member 39 on the bottom of the plate 32. It is thus seen that on movement of the roller 27 within the guide recess 33 and into the pocket 34 the keeper 36 is engaged and pivoted by the roller 27 in a clockwise direction. On movement of the roller 27 to a position adjacent the end 41 of the pocket 34 the keeper 36 slips past the roller 27 and into its roller locking position against the stop 39. Thus with the tongue supported in a raised position at which the roller 27 is capable of entering the guide recess 33 it is only necessary to reverse or back up the tractor in order to locate the roller in a locked position within the pocket 34.

To support the roller 27 for connection with the coupler device 30 in this manner there is provided a substantially U-shaped bracket member 42 straddling the hounds 26 and having the legs thereof pivoted on the king pin 24. A rod 43 is extended from the base of the U-shaped member 42 longitudinally of and below the member 10 and in a direction away from the hounds 26. The free end 45 of the rod 43 is carried in an eye member 44 welded or otherwise secured to the bottom of the member 10 adjacent its end 13. A spring 46 is mounted on the rod 43 and arranged in compression between the eye member 44 and an adjustable nut 47 which is slidable on the rod 43. On disconnecting the roller 27 from the coupler 28 the downward movement of the wagon tongue is limited by the compression of the spring 46 between the adjusting nut 47 and the eye member 44, and the spring pressure thus produced is applied through the rod 43 to pivot the bracket 42 until the base 40 thereof engages the hounds 26. It is readily apparent that the downward pivotal movement of the tongue can be limited to any desired position by merely changing the effective pressure of the spring 46 by adjustment of the nut 47. By virtue of this support of tongue in lifted position in substantially horizontal plane connection of tongue and tractor can be readily completed by the tractor operator, whereby second man usually required for this job is eliminated.

When the wagon or trailer vehicle is connected to the tractor the tongue is usually in its contracted position shown in Fig. 1. However, if a sharp turn, such as a complete reversal in direction U-turn is contemplated as commonly occurs in field work when pulling manure spreaders and the like, this contracted position of the shaft may result in the trailer vehicle moving or running into the tractor unit. To eliminate any possibility of the wagon interfering with the tractor the tongue or shaft is extended to provide ample clearance between the wagon and the tractor. This extension can be accomplished by the tractor operator, without his leaving the tractor, by the provision of an actuating arm 48 integrally formed with the latch member 16 (Figs. 3 and 4). Connected to the actuating arm 48 is a rope or cable 49 which extends to a position adjacent the operator's seat on the tractor. Thus before negotiating a sharp turn it is only necessary for the operator to pull on the rope 49 to lift the latch 16 and extend the tongue by virtue of the member 11 being pulled from the member 10 by the tractor. After the turn has been negotiated the operator again lifts the latch 16 out of a lug-engaging position and then reverses the tractor to contract the tongue by pushing the member 11 within the main member 10. This longitudinal adjustment of the tongue by the tractor operator, while he is in position on the tractor, has a further advantage when the wagon is used with a corn picker.

It is common practice to connect a wagon behind a corn picker for collecting the picked corn. Where the tongue of the wagon is of a fixed length the corn dumped from the usual elevator structure on the corn picker into the wagon always falls to the same place within the wagon. Thus it is usually necessary for one man to ride the wagon merely for the purpose of spreading the corn throughout the wagon. By means of the present invention this extra man is eliminated by initially connecting the wagon to the corn picker with the tongue in a fully contracted position. As the picking operation proceeds the tongue is progressively extended by the tractor operator, as above explained, to in turn provide for the corn from the picker being dumped progressively closer to the front of the wagon. The spreading of the corn within the wagon is thus accomplished by the tractor operator during the corn picking operation and while the operator is riding the tractor.

When the wagon is to be horse-drawn the member 11 is extended to its full out position. A neck yoke for a horse is attachable to a hook 51 carried on the top side of the roller supporting arm 28a.

A double tree 50, adapted for connection with the usual harness tugs (not shown) is pivoted on a bolt 53 inwardly from the end section 12 of the main member 10, and held in place by a bracket 54 supported on the bolt 53 and a bolt 55.

In one embodiment of the invention the main or tubular member 10 is fifty-nine inches long while the extendible member 11 is seventy-nine inches long, with the location of the latch member 16 being such as to provide for the extension of the member 11 to provide an all out length of nine feet six inches for the tongue. In its contracted position the tongue is about six feet long. The tongue is constructed entirely of metal and has an over-all weight of approximately 85 lbs. It is apparent, therefore, that the tongue is capable of being easily handled for assembly between the hound members of a wagon.

From a consideration of the above description it is seen that the invention provides a tongue for a trailer vehicle which is freely extended to varying lengths, either when the trailer is at a standstill or is in the act of being drawn, and having means for securely locking the tongue in an adjusted position.

Although the invention has been described with respect to a preferred embodiment thereof it is to be understood that it is not to be so limited since changes can be made therein which are within the full intended scope of this invention as defined by the appended claim.

I claim:

An extensible tongue for a vehicle including a main member of tubular construction having one end connected to said vehicle, said main member having an opening in its top side adjacent the other end thereof, a member receivable in said other end and slidably supported within said main member for longitudinal movement to adjusted positions relative thereto, longitudinally spaced catch portions on said slidable member successively movable across said opening on longitudinal movement of the slidable member, latch means carried on said main member having a bifurcated portion movable within said opening into a straddling position with a catch portion, means yieldably urging said movable portion into said straddling position to hold said slidable member in an adjusted position against longitudinal movement in opposite directions, means for limiting the movement of said slidable member outwardly from said main member, and manually operated means for moving and holding said movable portion out of a straddling position with a catch portion to provide for a free slidable movement of said slidable member to an adjusted position.

CHARLES EDWARD STRINGER.